United States Patent [19]
Ingram

[11] 3,756,370
[45] Sept. 4, 1973

[54] MOTION SENSING APPARATUS FOR FOOD HANDLING OR THE LIKE

[75] Inventor: Charles E. Ingram, Freeland, Mich.

[73] Assignee: Baker Perkins Inc., SaGinaw, Mich.

[22] Filed: Apr. 16, 1971

[21] Appl. No.: 134,612

[52] U.S. Cl. .................................. 198/37, 198/232
[51] Int. Cl. ...................... B65g 43/08, B65g 43/00
[58] Field of Search ...................... 198/37, 40, 127, 198/232, 34

[56] References Cited
UNITED STATES PATENTS

| 2,739,695 | 3/1956 | Haycock | 198/232 |
| 3,621,982 | 11/1971 | Fleischauer | 198/127 |
| 2,771,177 | 11/1956 | Cutter | 198/34 |

*Primary Examiner*—Richard E. Aegerter
*Attorney*—Learman & McCulloch

[57] ABSTRACT

Apparatus for use in a bakery, for example, wherein a conveyor system for conveying products, such as panned dough moves in a forward path of travel. A control system is provided which includes a control having a plurality of operating positions or conditions for controlling or affecting the products or the system to produce a desired result, and there is a sensor for sensing the presence of a product on the conveyor, a sensor for indicating if the passage of the products on the conveyor is interrupted, and apparatus connected to the sensors for operating the control system when a product on the conveyor is not moving forwardly.

6 Claims, 7 Drawing Figures

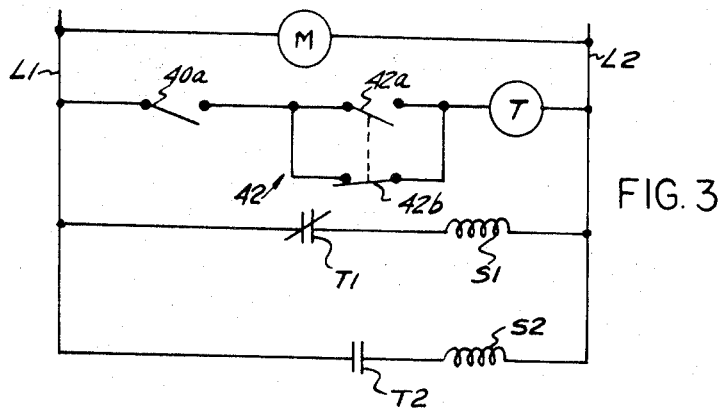
FIG. 3
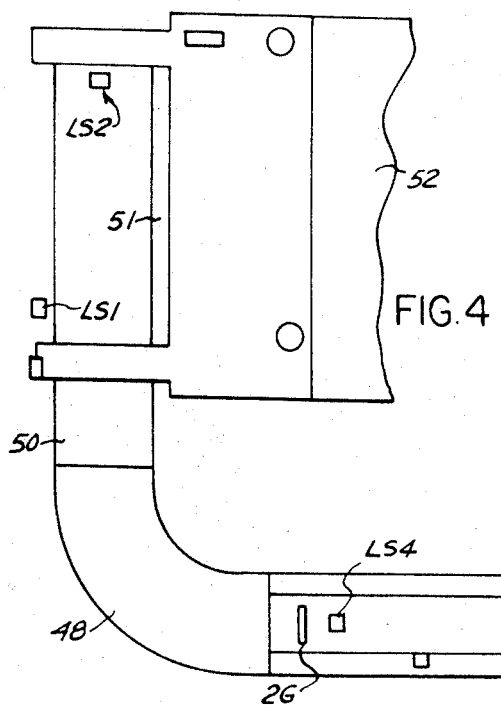
FIG. 4
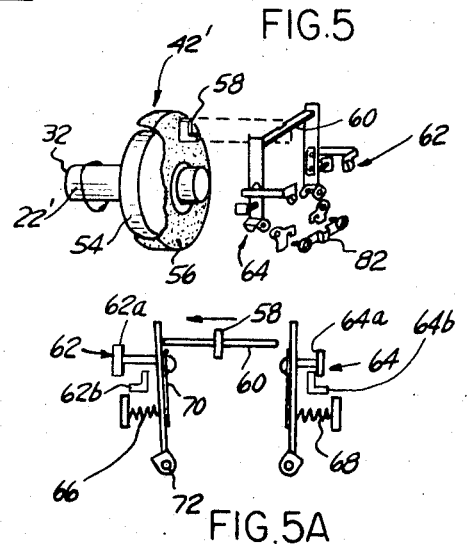
FIG. 5
FIG. 5A
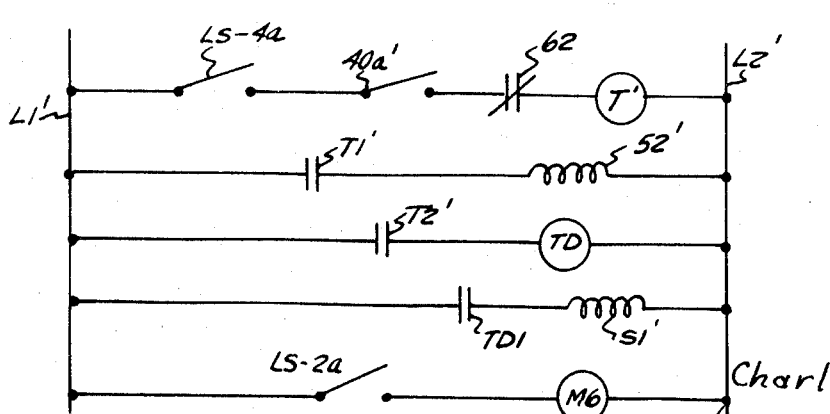
FIG. 6
INVENTOR
Charles E. Ingram

MOTION SENSING APPARATUS FOR FOOD HANDLING OR THE LIKE

FIELD OF THE INVENTION

This invention relates to apparatus which senses both the presence of a product to be conveyed and the absence of motion of such a product.

BACKGROUND OF THE INVENTION

Modern day bakeries generally include interrelated conveyors for transferring products, such as pans or pansets of dough, between bakery processing units, such as proofers and ovens. Occasionally, the products will "jam up" and be prevented from moving. If this condition is not detected, the products may be damaged. Accordingly apparatus is required which will sense the movement and lack of movement of such a bakery product so that the operation of equipment, such as stops and conveyors positioned either upstream or downstream of the sensor, can be adjusted, operated, or positioned to control further movement of the products.

Such motion sensing apparatus is also useful with a grouper conveyor which will accumulate a group of bakery products and then convey a full complement of products to the shelf or tray of a bakery processing unit such as a proofer. As the products are accumulated in the group, they will be prevented from moving until the group is formed. Motion sensing apparatus, constructed according to the present invention, can be used to determine when the group is formed by sensing the non-movement of the last product in the series of products being grouped. Control apparatus for controlling equipment, such as stops upstream and downstream of the grouping conveyor, can be operated to permit the group to be passed on to the processing unit downstream of the grouping apparatus and temporarily halt the passage of products upstream of the grouping apparatus.

SUMMARY OF THE INVENTION

Briefly, the invention is concerned with apparatus for sensing both the presence of a product on a conveyor and the lack of motion of that product. When the presence of a product is sensed and the product is not moving in a forward path of travel due to a jam up or other reason, time delay means is actuated to change, after a predetermined time delay, the operating condition of equipment, such as pan stops and conveyors, having a plurality of operating conditions for controlling or affecting the products or the equipment to obtain a desired result. If the product is moving forwardly, motion sensing means will reset the time delay means and the change will not occur.

Apparatus constructed according to the present invention can be used to cause gaps between the products and thereby eliminate the necessity of a speed-up unit as is sometimes required in prior art product handling systems. Apparatus constructed according to the present invention eliminates the necessity of physical contact between the product and a limit switch actuator and can be operated in either direction of conveyor travel. The apparatus requires no drive mechanism, is adjustable to object weight, is easily portable, sanitary in design, and is connected for operation to an electrical source of power by two wires. The apparatus can be used to eliminate the time delayed electrical signal usually associated with normal passage of an object past a sensing device.

Apparatus constructed according to the present invention requires no independent drive mechanism, is adjustable to product weight, and is portable enough to be moved easily. The apparatus is sanitary in design.

Other advantages of the present invention will become apparent to those of ordinary skill in the art when considered in conjunction with the appended claims and accompanying drawings in which:

FIG. 3 is a schematic diagram of an electrical control circuit for controlling the operation of the apparatus illustrated in FIGS. 1 and 2;

FIG. 4 is a schematic, top plan, fragmentary view illustrating a bakery system including apparatus constructed according to the present invention;

FIG. 5 is a perspective view illustrating apparatus incorporating switching mechanism embodied in the present invention;

FIG. 5A is a fragmentary, side view of the apparatus illustrated in FIG. 5; and

FIG. 6 is another schematic diagram of an electrical control circuit in which apparatus constructed according to the present invention is connected.

Figure 1:
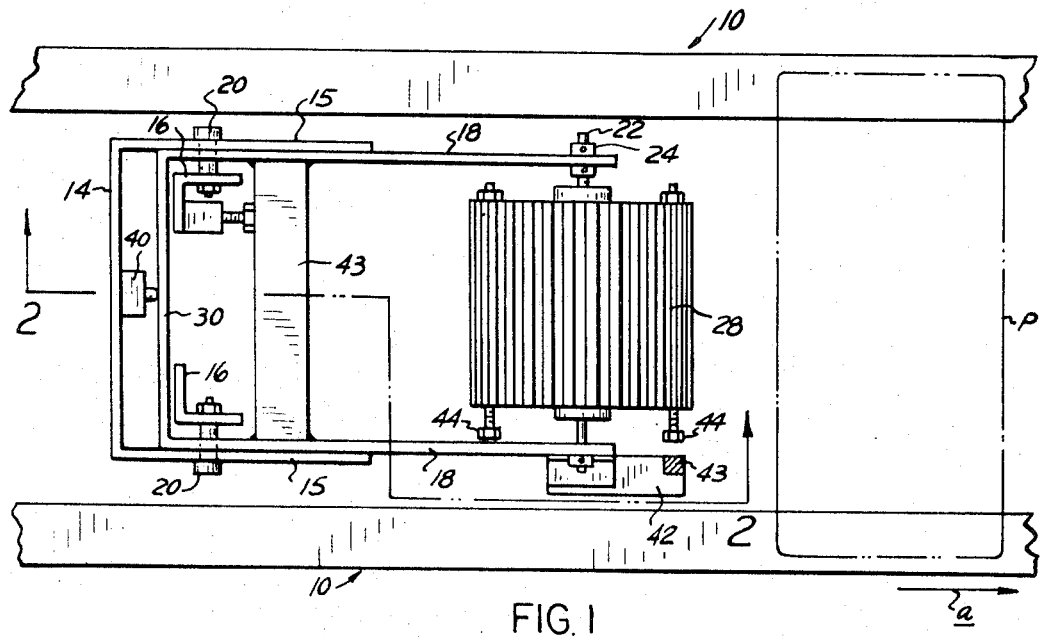
FIG. 1 is a top plan view illustrating apparatus constructed according to the invention.
Figure 2:
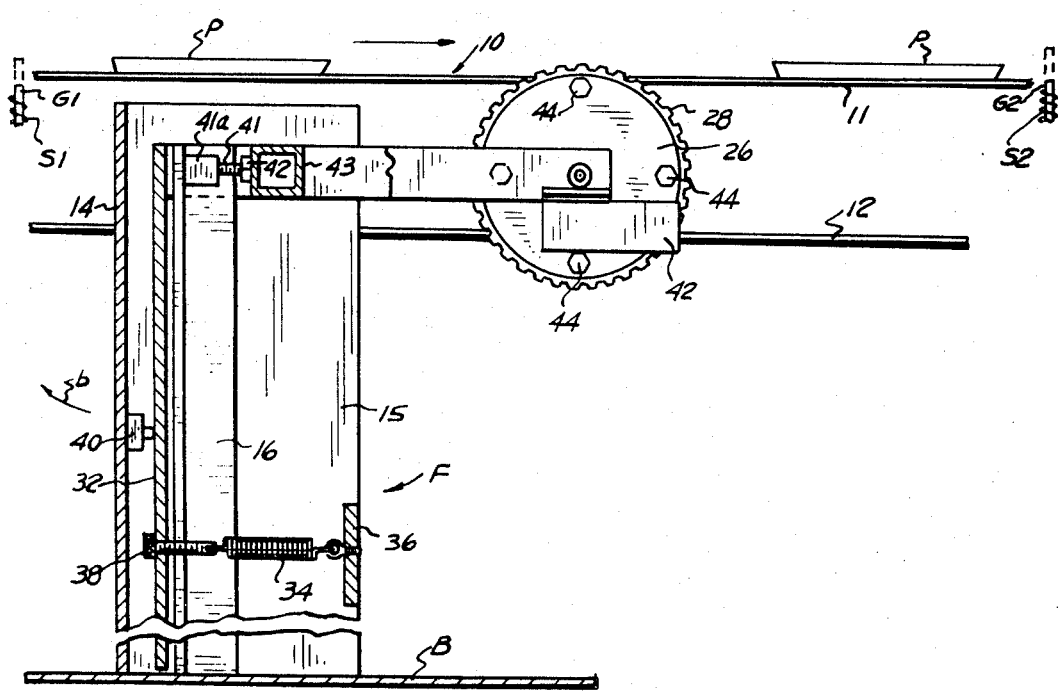
FIG. 2 is a sectional, side view of the apparatus, taken along the line 2—2 of FIG. 1.

Referring now more particularly to the drawings, and in the first instance to FIGS. 1–3, bakery apparatus constructed according to the present invention is adapted for use with a pair of longitudinally extending, laterally spaced apart, endless conveyors, generally designated 10, such as flat top chain conveyors or endless, spaced apart conveyor belts, for conveying pans P of bakery products from left to right in the direction represented by the arrow $a$ in FIG. 1. The endless belts 10 include upper and lower runs 11 and 12 and are trained around suitable pulleys (not shown) which are continuously driven by a motor M (FIG. 3). The drive pulleys are supported for rotation on a frame, generally designated F, that includes a base B supporting a pair of upstanding side frame members 15 spanned by a vertical end wall 14, and a pair of upstanding support posts 16, disposed laterally inwardly of the opposite side frame member 15. A pair of sensor drum supporting longitudinal members 18 are pivoted on a pair of pivot pins 20, which are supported for rotation between the support members 15 and 16. Sets of bearings 24 are provided on the longitudinal members 18 for rotatably supporting a drum supporting shaft 22. A non-magnetizable, freely rotatable drum or roll 26 is fixed to the shaft 22 and includes an outer circumferential layer or belt of undulating or grooved, resilient material 28, such as rubber. As will be presently described, the drum 26 is positioned between the conveyors 10 at a height which permits the material 28 to be engaged by the underside of a pan P moving on the conveyor belts 10. A plurality of circumferentially spaced, magnetizable bolts 44 are threaded in opposite ends of the drum 26 for a purpose to be described more particularly hereinafter.

Spanning the longitudinal, roll supporting, members 18 is a cross member 30 having a dependent leg 32 which is connected, at its lower end, by means of a bolt 38 and a spring 34, to a cross member 36 spanning the upstanding support members 14. The bolt 38 is threaded in the dependent leg 32 and can be turned to adjust the tension on the spring 34. The spring 34 operates to normally maintain the apparatus in the position illustrated in FIG. 2, wherein the upper surface of the wheel or drum 26 projects slightly above the level of the conveyors 10 and into the path of a pan P proceeding forwardly thereon. A plunger type proximity sensing limit switch 40, for sensing the presence of a pan P on the conveyor belts 10, is positioned on the wall 14 adjacent the leg 32 such that when a pan P passes over the roll 26, the weight of a pan P will depress the roll 26 about the pivots 20 and swing the dependent leg 32 clockwisely, in the direction represented by the arrow b (FIG. 2) to actuate the proximity limit switch 40. The relative vertical positions of the drum 26 and the conveyor belts 10 can be adjusted by an adjustment screw 41 threadedly received in a nut 42 that is fixed to a tubular cross member 43 which spans the roll supporting side members 18. A stop 41a is welded, or otherwise suitably secured, to the upstanding frame members 14 to limit the vertical travel of the screw 41 and the roll 26.

The movement of the pans P in a forward path on the conveyors 10 is sensed by a magnetic field-responsive limit switch 42 fixed to one of the longitudinal, roll supporting members 18. The switch 42 may be the GO type switch manufactured by General Equipment & Manufacturing Company of Louisville, KY, Ky, model No. 77-100. The switch 42 may include a magnetic field producing member such as a permanent magnet 43 and sets of contacts 42a and 42b (FIG. 3) which are movable between open and closed positions depending on the strength of the magnetic field. When one of the plurality of circumferentially spaced magnetizable bolts 44 on the non-magnetic drum 26 moves past the switch 42, the magnetic field is affected or strengthened so that the switches 42a and 42b move to the opposite one of said open and closed positions.

Referring now more particularly to FIG. 3, a schematic diagram of a control circuit incorporating apparatus constructed according to the invention is disclosed and includes a pair of lines L1 and L2 connected across a suitable source of power such as 110 volt, 60 cycle, alternating current. The motor M, for driving the conveyor belts 10, is connected across the lines L1 and L2. The limit switch 40 for sensing the presence of a pan P includes a set of normally open contacts 40a comprising the first circuit element connected in series with the timer T and a parallel circuit having two branches including the normally open contacts 42a and the normally closed contacts 42b respectively, of the magnetic switch 42. The contacts 42a and 42b, and timer T, constitute a second circuit element which is controlled by the sensing apparatus independently of the first element 40. The timer T may be the timer model 9050-ROIE manufactured by Square D Company of Milwaukee, Wis. The timer T, upon timing out, closes a set of normally closed contacts T1 connected in series with a solenoid S1 and a pair of normally open contacts T2 connected in series with a solenoid S2. The solenoids S1 and S2 may comprise suitable control elements for actuating gates G1 and G2 (FIG. 2) positioned upstream and downstream, respectively, of the sensing apparatus, or for interrupting or initiating the operation of a proofer, an oven, a conveyor, or some other bakery processing unit (not shown) and the circuit lines which include them may be referred to as the output section of the control circuit.

In the operation of the apparatus described heretofore, as each pan P proceeds on the conveyors 10, it engages and depresses the drum 26 causing it to pivot downwardly about the pivot pins 20 against the spring tension of spring 34 to move the dependent leg 32 into engagement with the limit switch 40 and close the normally open contacts 40a. The timer T will be energized through the closed contacts 42b, however, the timer contacts T1 and T2 will remain in the closed and opened positions respectively until the timer T times out. As the pan proceeds over the drum or roll 26, it revolves the drum 26 to move the magnetic bolts 44 past the magnetic limit switch 42 to periodically actuate the magnetic limit switch and alternately close the contacts 42a and open the contacts 42b to alternately periodically and temporarily interrupt current flow to the timer T. Each time the current flow to the timer T is interrupted, the timer T is automatically reset and again initiates the timing cycle. If the pans P are proceeding properly, the timer T will continually reset so that it will never time out. Should, however, the pans upstream of drum or roll 26 jam and back up, so that a pan P is at rest on the roll 26 and not rotating it, one of the sets of contacts 42a or 42b would remain closed beyond the predetermined time so that the timer T would be permitted to time out and the contacts T1 and T2 would open and close respectively. When the contacts T1 and T2 open and close, the solenoids S1 and S2 are deenergized and energized respectively to lower and raise gates G1 and G2 respectively.

It is important to note that this sequence of events cannot occur unless a pan P is depressing the drum 26 because the contacts 40a would otherwise be open and the circuit would be inoperative.

Referring now to FIG. 4, apparatus constructed according to the present invention is disclosed in a bakery system including a pair of continuously driven conveyor belts 10' constructed substantially identically to the conveyor belts 10, and a continuously driven corner conveyor 48 receiving products from the conveyors 10' and conveying them to a load conveyor 50 adjacent the supply end of an oven or proofer 52. The oven or proofer 52, which may be of the type disclosed in U.S. Letters Pat. No. 3,266,616, granted Aug. 16, 1966, and assigned to the assignee of the present invention, includes a loader-pusher, schematically designated 51, for moving the products off the load conveyor 50 and into the proofer 52.

At the discharge end of the conveyors 10', a raisable and lowerable conventional pan stop 2G is provided and is spring biased to a raised position to interrupt the passage of pans P'. It is movable to a depressed position to permit pans P' to pass on to the conveyor 48 when a sufficient number of pans has been grouped thereon. A limit switch LS-4 is provided adjacent the stop 2G for indicating the presence of a pan P at the gate 2G. Another similar pan stop 1G is provided at the supply end of the conveyor 10' and is normally spring biased to a position flush with the conveyor 10' to permit pans to pass on the conveyor 10' to the second gate 2G.

It is to be understood that the pan stops 2G and 1G are conventional solenoid actuated pan stops which are normally spring-returned to the raised and lowered positions, respectively, and are movable to their lowered an raised positions respectively when their respective solenoids are energized.

The apparatus for sensing the motion of the pans P on the conveyor 10' includes a frame supported pivotally mounted drum 26', identical to the drum 26, and a switch 42' (see FIG. 5) commonly referred to as a "no-speed" or "plugging" switch. The switch 42' differs in construction and operation from the switch 42 previously described.

The no speed switch 42' includes an annular, permanent magnet 54 (see FIG. 5), fixed to a shaft 22' on which the drum 26' is fixed for rotational movement therewith. Disposed adjacent the end of the disc 54 and journaled on the shaft 22' is a cup-shaped member 56 formed of electrically conductive material such as copper. Fixed to the cup 56 is a foot 58 supporting a cross member 60 for movement therewith. Disposed on opposite sides of the shaft 22' are pairs of operating switch contacts, generally designated 62 and 64, which are spring biased to the closed positions by springs 66 and 68 respectively. One of the contacts of each set is fixed, whereas the other contact of each set is mounted for movement on a support 70 pivoted on a pivot pin 72. As the drum 26' and shaft 22' are rotated by a pan P passing thereover, the field of the permanent magnet 54 induces a voltage in the copper cup 56 which causes a current to flow therein. Generation of this current produces a field which interacts with the field of the permanent magnet to produce a rotational torque which is exerted on the cup 56. The torque thus developed, varies in almost direct proportion to shaft speed and tends to rotate the cup in the direction of shaft rotation. Thus, operation of the system is the same regardless of the direction in which the conveyor 10' moves. As the shaft speed increases from a standstill position, the rotational torque increases and when the torque is great enough to overcome the opposing spring force of one of the sets 66 and 68, one of the movable contacts 62a or 64a is forced away from the stationary contacts 62b or 64b respectively. The contacts then remain open while the shaft speed increases to a constant velocity. As the shaft speed is reduced, a point is reached where the spring force again exceeds the operating torque and the contacts return to their normally closed position. The contacts 62a and 64a are connected electrically, by means of a jumper 82 common to both set of contacts. The proximity sensing mechanism of the apparatus in FIG. 4 for sensing the presence of a product on the conveyor 10' is identical to that of FIG. 2, and is actuated when the drum 26' is swung downwardly as previously described.

A control circuit, in which the apparatus illustrated in FIGS. 4 and 5 is incorporated, is schematically illustrated in FIG. 6, and includes a pair of lines L1' and L2' connected to a suitable source of electrical power. The limit switches LS-4 and 40' include sets of normally open contacts LS-4a and 40a' connected in series circuit with the normally closed contacts 62 of the plugging switch 42', and a timer T'. The timer T' includes a set of contacts T1' which close when the in series therewith. The timer TD includes a set of normally open contacts TD1 which close when the timer TD times out and which are connected in series with the solenoid S1' for raising the rear gate G1'. A limit switch LS-2 is on the loader conveyor 50 adjacent the unit 52 and includes a set of normally open contacts LS-2a connected in series with the motor M6 which drives the sweep loader 51 of the processing unit 50. The limit switch LS-2 is actuated by a product moving on the conveyor 50. timer T' "times out" and which is connected in series with the solenoid 52' for lowering the gate G2. The timer T' also includes a set of normally open contacts T2' which close when the timer T times out to energize a second timer TD connected In the operation of the apparatus illustrated in FIGS. 4, 5 and 5A, when the pan stops 2G and 1G are in their raised and lowered positions respectively, pans or pansets P' will pass over the drum 26' and accumulate on the conveyor 10' adjacent the gate 2G to actuate the limit switch LS-4 and close the limit switch contacts LS-4a. As the pans P pass along the conveyors 10', the drum 26' is pivoted downwardly so that the limit switch contacts 40a' are closed. The timer T' is not energized for a sufficiently long time to time out, however, because the turning drum 26' and permanent magnet 54 causes the copper cup 56 to rotate and open the normally closed contacts 62. When enough pans have accumulated so that the pans P will not rotate the drum 26 and permanent magnet 54 of the plugging switch 42', the contacts 62 will again close and remain closed, and the timer T' will be permitted to time out, thereby causing the front pan stop 2G to lower and permit the pans P' grouped thereon to pass on to the conveyors 48 and 50. The timer TD which is actuated by the closing of the timer contacts T2' operates to close the contacts TD1 a short time thereafter to raise the rear pan stop 1G to the raised position and present passage of pans P so as to provide proper spacing between groups of pans. When the group of pansets have reached the forward end of conveyor 50, the limit switch LS-2 is actuated and the loader conveyor sweep motor M6 will be energized to drive the pusher 51 and sweep the pans off the load conveyor 50 and into the oven or proofer 52.

It should be understood, of course, that the control solenoids S1' and S2' could be connected in circuit with any apparatus which will control or affect the products and produce a desired result either upstream or downstream of the sensing mechanism. For example, the solenoids S1' and S2' could be connected in circuit with the control elements of the oven or proofer 52, the drive motors for conveyors 48 and 50 or conveyors upstream of the conveyor 10'.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

I claim:

1. In a system wherein products are conveyed:
  a conveyor for transporting products, such as bakery product pans, successively in a forward path of travel;
  a control circuit, operative to effect a control function, having an output section which is energizable and deenergizable;
  sensing means associated with the conveyor for sensing whether a product is present on the conveyor and whether the product whose presence is sensed is moving;
  a first circuit element in the circuit, controlled by the sensing means and indicating the presence of a product on the conveyor at a predetermined location; and a second circuit element controlled by said sensing means, independently of said first circuit element, which is sensitive to whether the product whose presence is indicated is moving along the conveyor, connected in circuit with said first element and said output section;

said first and second elements being connected in said circuit so that, only when both the presence of a product and the substantial absence of motion of that product are independently sensed, can the control function be effected.

2. The system as set forth in claim 1 wherein the second circuit element includes energizable, resettable, time delay means, connected in circuit with said first circuit element, for preventing energization of said output section if the products continue to move along said conveyor.

3. The system as set forth in claim 1 wherein said sensing means comprises endless means adjacent said conveying means, movable in an endless path by successive products moving in said forward path of travel.

4. The system as set forth in claim 1 wherein said sensing means comprises a rotary drum mounted for swinging movement about a pivotal axis offset from its axis of rotation, and means biasing said drum to a pivoted position in which at least a portion of said drum is disposed in the path of said conveyed product so as to be rotated about its own axis by a product moving forwardly in said path of travel, but permitting said drum to be swingably displaced about said pivotal axis by the weight of said product moving forwardly on said conveyor.

5. The system as set forth in claim 4 wherein said second circuit element includes electrically energizable timer means connected in circuit with said first element and having a set of contacts, connnected in said output section, movable, a predetermined time after the presence of a product on said conveyor has been sensed, between open and closed positions.

6. The system as set forth in claim 1 wherein said sensing means comprises endless means mounted for movement between raised and lowered positions, means biasing said endless means to a raised position in which at least a portion of said endless means is disposed in the path of said conveyed product so as to be moved thereby in an endless path of travel when said product is moving but permitting said endless means to be displaced to said lowered position by said product moving forwardly on said conveying means; said first circuit element being responsive to displacement of said endless means to said lowered position, said second element being responsive to movement of said endless means in said endless path of travel.

* * * * *